A. W. CORWIN.
TRAILER COUPLING.
APPLICATION FILED MAR. 13, 1920.

1,351,098.

Patented Aug. 31, 1920.

Inventor
Allen W. Corwin
By his Attorney
Laurie F. Witter

UNITED STATES PATENT OFFICE.

ALLEN W. CORWIN, OF WELLSVILLE, NEW YORK.

TRAILER-COUPLING.

1,351,098.  Specification of Letters Patent.  Patented Aug. 31, 1920.

Application filed March 13, 1920. Serial No. 365,444.

*To all whom it may concern:*

Be it known that I, ALLEN W. CORWIN, a citizen of the United States, residing at Wellsville, New York, have invented certain new and useful Improvements in Trailer-Couplings, of which the following is a specification.

This invention relates to coupling devices and particularly to a coupling device adapted to operatively connect two vehicles or, more specifically, a trailer to a tractor vehicle. The general object of the invention is to provide an improved coupling mechanism for the purpose defined.

It is an object of the invention to provide a trailer coupling of simple yet strong and substantial design and of few parts. Another object of the invention resides in providing a trailer coupling that is very easily operated and which provides the maximum security and flexibility in use. A further and important object of the invention is the provision of a trailer coupling the parts of which may be very easily and cheaply manufactured and very readily assembled.

With the above and other objects in view which will appear as the description proceeds, the invention will now be described by reference to the drawing wherein.

Figure 1:
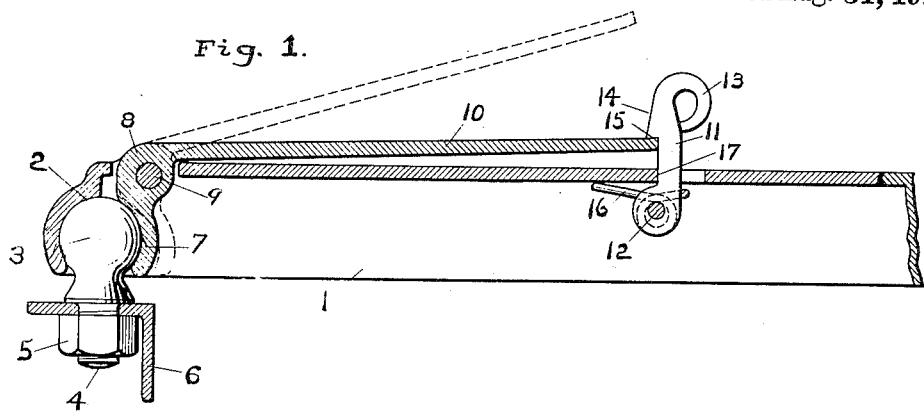
Figure 1 is a longitudinal vertical section through the trailer coupling, certain elements thereof being shown in side elevation.

Referring more specifically to the drawing by reference characters, 1 indicates the tongue element or member of a trailer to be secured to a tractor vehicle. This member may comprise either the entire tongue of the trailer or only sufficient thereof to support the coupling elements thereon, the member in the latter case being secured to the trailer tongue in any suitable manner. As shown in the drawing, the member is preferably of U-shaped construction and the forward or coupling end thereof is closed in the manner illustrated to form a socket 2 to receive the ball member 3 of the coupling mechanism. This member 3 is preferably provided with a threaded shank 4 and a nut 5 by which it may be secured to a part 6 of the tractor vehicle.

The ball-securing or locking mechanism coöperating with the parts of the device so far described necessarily comprises a means for engaging the ball member, a second means for operating the first means, and a third means for locking the first and second means in ball-securing position. While the entire construction may comprise a separate element for each means if desired, in order to secure the objects of the invention as heretofore stated, I preferably form the first and second means as a single one-piece element of simple construction. As shown in the drawing, the ball-engaging means comprises an arm 7 preferably concaved to the shape of the ball and integrally secured to a hub 8 pivoted on the tongue member at 9, the said means extending through a hole formed in the top of the tongue member. The operating means for the arm 7 comprises a second arm or lever 10 also integrally secured to the hub 8 and adapted in operation to swing toward and from the tongue member. The arms 7 and 10 are preferably formed of a resilient material and the arm 10 is relatively long whereby the same serves as an operating lever and, when locked in the operative position, extends in a general direction lengthwise of the tongue member and holds the arms 7 resiliently engaged with the ball member 3. It will therefore be seen that the long resilient locking lever 10 serves both as a power means to force and center the ball into its socket and as a means to securely hold the ball so resiliently engaged that the vehicle coupling is entirely flexible and free from any ratling which would induce wear and looseness of the parts thereof.

Figure 2:
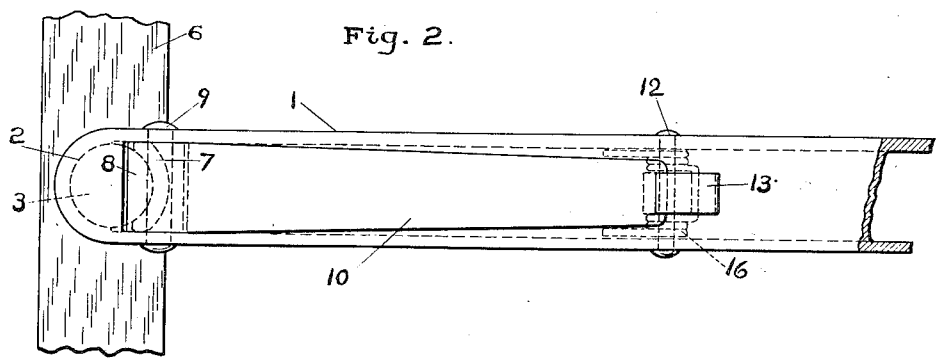
Fig. 2 is a top plan view thereof.

The above described elements may be locked in ball-securing position by any desired means as, for example, by a latch on one of the elements. I preferably mount a latch on the tongue member in a position to engage the end of the lever 10. As shown in Figs. 1 and 2 of the drawing, a latch 11 is pivoted to the tongue member at 12, passes through a hole formed in the top of the tongue member, and has an upwardly extending arm-engaging shank having its extremity formed into a finger hold 13 for disengaging the latch. The forward portion of the latch is provided with a beveled face 14 for receiving the end of the lever and is notched to provide a locking face 15 to engage the lever in locking position. A spring 16 preferably mounted on the pivot pin 12 normally holds the latch in its forward position in engagement with the tongue at 17. It will be seen that to place and lock the device in ball-securing position it is only necessary to push downward on the lever 10 whereupon the end of such lever engages the beveled face 14 and forces the latch backward until the notch is reached and the latch snaps into locking engagement with the lever. It will be noted by reference to Fig. 1 that the locking face 15 of the latch and the complemental engaging face on the lever are formed or arranged at a slight angle to the horizontal whereby such elements will remain in their locking position even though the spring 16 should break or become inoperative.

Figure 3:
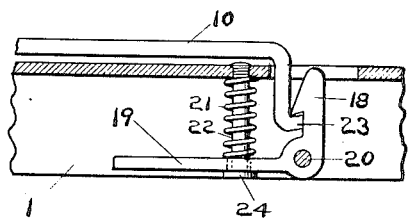
Fig. 3 is a fragmentary detail section of a portion of the coupler, showing a modified form of locking latch.
Figure 4:
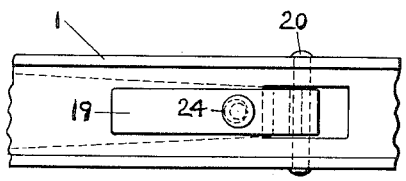
Fig. 4 is a bottom plan view thereof.

While the structure above described provides a simple and secure locking device for the coupling lever, it may for some purposes be desired to use a latch mechanism substantially or entirely housed within the tongue member. As one form of such a structure, I have shown the latch mechanism illustrated in Figs. 3 and 4 of the drawing. In this construction the latch comprises a head 18 and a disengaging tail element 19, the latch being pivoted to the tongue at 20. The latch is normally held in its engaged position by means of a spring 21 mounted on a bolt 22 screwed into the top portion of the tongue. In this form of the device, the end of the lever 10 is bent to provide a lug 23 extending down into the tongue in locked position. The head 24 of the bolt serves as a stop to hold the latch in proper position for engagement by the lug 23. The engaging and locking operation is the same as above described, it only being necessary to push downwardly on the lever 10 until the latch snaps into engagement with the lug 23. An upward pressure on the tail 19 serves to release the latch from engagement with the lever. It will be noted that the tail 19 of the latch extends horizontally in front of the head 18 thereof in such manner that should the spring 21 become inoperative the weight of the tail 19 would hold the latch in its secured position. Also I preferably form the engaging faces of the latch and lever at a slight angle, as in the construction illustrated in Fig. 1, whereby such elements are held securely in the locking position.

The present invention is particularly applicable to use in coupling a trailer to an automobile. It is well known that such devices are subjected to severe strains and jars over very rough roads and trails and such a coupling to be satisfactory must be so substantial and secure as to withstand this severe usage. In designing the present structure these requirements, as well as ease and cheapness of manufacture, have been considered and it is believed that the objects of the invention, as stated in the preamble to the specification, are fully realized in the construction herein disclosed. However, while the preferred embodiment of the invention is herein illustrated, I would have it clearly understood that such modifications as come within the scope of the appended claims may be made without departing from the spirit of the invention.

What I claim is:

1. A trailer coupling comprising the combination of a ball member mounted on an upwardly extending shank adapted to be secured to a vehicle, a tongue member having a socket opening through the bottom thereof and adapted to fit over the major portion of the ball member, and ball securing mechanism comprising means on the tongue member for engaging the ball member to lock the same in the socket, operating means comprising a relatively long lever pivoted to the tongue member above the socket and adapted to swing toward and from the tongue member about such pivot to move the first mentioned means longitudinally of the tongue member directly toward and from and into and out of operative engagement with the ball member, such lever in its operative locking position extending in a general direction lengthwise of and closely adjacent the tongue member and in its inoperative position diverging therefrom and means for locking the pivoted means in the operative ball-engaging position.

2. A trailer coupling comprising the combination of a ball member mounted on an upwardly extending shank adapted to be secured to a vehicle, a tongue member having a socket opening through the bottom thereof and adapted to fit over the major portion of the ball member, and ball securing mechanism comprising means on the tongue member for engaging the ball member to lock the same in the socket, operating means comprising a relatively long resilient lever pivoted to the tongue member above the socket and adapted to swing vertically toward and from the tongue member about such pivot to move the first mentioned means longitudinally of the tongue member directly toward and from and into and out of operative engagement with the ball member and means on the tongue member for engaging the free end of the lever to lock the same in its operative ball-securing position, the lever in such position being held under restraint whereby the ball is resiliently held in the socket.

3. A trailer coupling comprising the combination of a ball member mounted on an upwardly extending shank adapted to be secured to a vehicle, a tongue member having a socket opening through the bottom thereof and adapted to fit over the major portion of the ball member, securing means comprising two relatively angular arms pivoted to the tongue member, one of such arms in its securing position extending horizontally along the tongue member and serving as a handle for operating the means about its pivot and the other arm in its securing position extending vertically and transversely of the tongue member and adapted by the locking movement of the first arm to be moved longitudinally of the tongue member directly toward and against the ball member to secure the same in the socket, and a latch operative between the first arm and the tongue member to lock the securing means in locking position.

4. A trailer coupling comprising the combination of a ball member mounted on an upwardly extending shank adapted to be secured to a vehicle, a tongue member having a socket opening through the bottom thereof and adapted to fit over the major portion of the ball member, securing means comprising two relatively angular arms pivoted to the tongue member at their intersection, one of such arms in its securing position extending horizontally along the tongue member and serving as a handle for operating the means about its pivot and the other arm in its securing position extending vertically and transversely of the tongue member and adapted by the locking movement of the first arm to be moved longitudinally of the tongue member directly toward and against the ball member to secure the same in the socket, and a latch operative between the first arm and the tongue member to lock the securing means in locking position, the said first mentioned arm being relatively long and resilient whereby the ball member is easily forced to position in the socket and resiliently locked therein.

5. A trailer coupling comprising the combination of a ball member mounted on an upwardly extending shank adapted to be secured to a vehicle, a tongue member having a socket opening through the bottom thereof and adapted to fit over the major portion of the ball member, and ball securing mechanism comprising means on the tongue member for engaging the ball member to lock the same in the socket, operating means comprising a relatively long resilient lever pivoted to the tongue member and adapted to swing toward and from the tongue member about such pivot to move the first mentioned means, directly toward and from and into and out of operative engagement with the ball member and means comprising a latch mounted on the tongue member substantially within the outlines thereof and adapted to engage the free end of the lever to lock the same in its operative ball-securing position.

6. A trailer coupling comprising the combination of a ball member, a tongue member having a socket opening through the bottom thereof and adapted to fit over the major portion of the ball member, and ball securing mechanism comprising means on the tongue member for engaging the ball member to lock the same in the socket, operating means comprising a relatively long resilient lever pivoted to the tongue member and adapted to swing toward and from the tongue member about such pivot to move the first mentioned means directly toward and from and into and out of operative engagement with the ball member, and a spring-pressed latch mounted on the tongue member, said latch having a beveled face and an adjacent locking face and being adapted to be forced backwardly against the action of its spring by the engagement of the lever with the beveled face and to snap into locking position with its locking face in engagement with the lever whereby the lever is locked in its operative ball-securing position.

7. A trailer coupling comprising the combination of a ball member mounted on an upwardly extending shank adapted to be secured to a vehicle, a U-shaped tongue member having its extreme forward end closed to form an end socket adapted to fit over the major portion of the ball member, and ball-securing mechanism comprising means pivoted adjacent the upper portion of the socket for engaging and holding the ball member in the socket, a second means adapted to rock the first means about the pivot to engage and disengage the first means with the ball member and means on the tongue member for engaging the second means to hold the first mentioned means in its operative ball-securing position.

8. A trailer coupling comprising the combination of a ball member, a tongue member having a socket therein adapted to fit over the major portion of the ball member, a one-piece locking member comprising a body and two arms, such member being pivoted to the tongue member adjacent the upper portion of the socket and adapted to be rocked about its pivot to engage one of the said arms with the ball member to lock the same in the socket, the ball-engaging arm extending from the pivot in a substantially vertical direction and the other arm extending from the pivot in a substantially horizontal direction closely adjacent the tongue member when the member is in the ball-securing position and means on the tongue member adapted to engage the other arm to hold the locking member in locking position.

9. A trailer coupling comprising the combination of a ball member mounted on an upwardly extending shank adapted to be secured to a vehicle, a tongue member having a socket therein adapted to fit over the major portion of the ball member, a one-piece locking member comprising a body and two arms, such member being pivoted to the tongue member and adapted to be rocked about its pivot to engage one of the said arms with the ball member to lock the same in the socket, the other arm being relatively long and resilient and in its operative ball-securing position extending substantially lengthwise of the tongue member, and a latch on the tongue member adapted to engage the free end of the long arm to secure the locking member in locking position.

10. A trailer coupling comprising the combination of a ball member mounted on an upwardly extending shank adapted to be secured to a vehicle, a tongue member having a ball-receiving socket opening through the bottom thereof, a securing member pivoted near the top of the tongue member adjacent the socket and comprising two radiating arms, one of such arms being adapted to engage the ball member to secure the same in the socket, the other arm being resilient and relatively long and in its operative ball-securing position extending lengthwise of the tongue member, and a latch for securing the free end of the relatively long arm to the tongue member.

11. A trailer coupling comprising the combination of a ball member mounted on an upwardly extending shank adapted to be secured to a vehicle, a tongue member having a ball-receiving socket opening through the bottom thereof, a securing member pivoted near the top of the tongue member adjacent the socket and comprising two radiating arms, one of such arms being adapted to engage the ball member to secure the same in the socket, the other arm being resilient and relatively long and in its operative ball-securing position extending lengthwise of the tongue member, and a spring-pressed latch having a head for engaging and locking the last mentioned arm in its operative position and a tail for releasing the latch, the latch being mounted substantially within the outlines of the tongue member.

12. A trailer coupling comprising the combination of a ball member mounted on an upwardly extending shank adapted to be secured to a vehicle, a tongue member having a ball-receiving socket opening through the bottom thereof, securing means on the tongue member comprising a ball-engaging element and a relatively long resilient operating arm therefor, a spring-pressed latch having a locking face thereon adapted to engage and lock the said arm in the securing position, the locking face of the latch and the complemental engaging face of the arm being so formed that the same will not become disengaged even though the latch-operating spring becomes inoperative.

13. A trailer coupling comprising the combination of a ball member mounted on an upwardly extending shank adapted to be secured to a vehicle, a tongue member having a ball-receiving socket opening through the bottom thereof, securing means on the tongue member comprising a ball-engaging element and a relatively long resilient operating arm therefor, a spring-pressed latch mounted substantially within the outlines of the tongue member and having a beveled face and a locking face and being adapted to be forced backwardly against the action of its spring by the engagement of the arm with the beveled face and to snap into locking position with its locking face in engagement with the arm whereby the arm is locked in its operative ball-securing position.

In testimony whereof I hereto affix my signature.

ALLEN W. CORWIN.